(12) United States Patent
Chen

(10) Patent No.: US 7,350,111 B2
(45) Date of Patent: Mar. 25, 2008

(54) METHOD OF PROVIDING A REAL TIME SOLUTION TO ERROR OCCURRED WHEN COMPUTER IS TURNED ON

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 512 days.

(21) Appl. No.: 10/909,293

(22) Filed: Aug. 3, 2004

(65) Prior Publication Data

US 2006/0031716 A1 Feb. 9, 2006

(51) Int. Cl.
*G06F 11/00* (2006.01)
(52) U.S. Cl. .............................. 714/36; 713/2
(58) Field of Classification Search ............... 714/36, 714/33, 2
See application file for complete search history.

(56) References Cited

U.S. PATENT DOCUMENTS

| | | | |
|---|---|---|---|
| 6,393,559 B1 * | 5/2002 | Alexander | 713/2 |
| 6,463,531 B1 * | 10/2002 | Aguilar et al. | 713/2 |
| 6,507,906 B1 * | 1/2003 | Criddle et al. | 713/2 |
| 6,629,240 B1 * | 9/2003 | Lee | 713/2 |
| 6,807,643 B2 * | 10/2004 | Eckardt et al. | 714/36 |
| 6,862,695 B2 * | 3/2005 | Lin | 714/36 |
| 2003/0212936 A1 * | 11/2003 | Neuman et al. | 714/723 |

OTHER PUBLICATIONS

THE PC Guide (http://www.PCGuide.com□□Site Version: 2.2.0—Version Date: Apr. 17, 2001 □□Copyright 1997-2004 □□Charles M. Koazierok.*

* cited by examiner

*Primary Examiner*—Scott Baderman
*Assistant Examiner*—Paul F Contino
(74) *Attorney, Agent, or Firm*—Bacon & Thomas, PLLC

(57) ABSTRACT

The present invention relates to a method of providing a real time solution to an error occurred when a computer is turned on, which enables a BIOS installed in the computer to test all hardware equipment of the computer and record any detected error, and also enables the BIOS to show a solution corresponding to the error on a display connected to the computer through pressing a function key of an input device coupled to the computer while the test is finished.

1 Claim, 3 Drawing Sheets

METHOD OF PROVIDING A REAL TIME SOLUTION TO ERROR OCCURRED WHEN COMPUTER IS TURNED ON

FIELD OF THE INVENTION

The present invention relates to a computer error correction method, more particularly to a method of providing a substantially real time solution to an error occurred when a computer is turned on.

BACKGROUND OF THE INVENTION

BIOS (Basic Input Output System) is adapted to handle all input and output functions when a computer is turned on. There is a small difference between two BOSS produced by any two manufacturers. However, in general, any type of BIOS is adapted to perform the following steps after a computer is turned on.

(1) First, the internal power supply of the computer will start only after a stable power is outputted from an external power source. Otherwise, the computer may be damaged. Next, a chips et of the mother board of the computer issues a reset signal to a processor (e.g., CPU (central processing unit)) so that the processor may reset the computer prior to entering a state of waiting for an instruction.

(2) After receiving the reset signal, the processor waits the input of instruction. The processor will process an input instruction. At this time, there is no data in the processor. Previously performed actions are interrupted and data is initialized. Based on the scheme of processor, the processor is required to access a next instruction (e.g., program for initializing the computer) to be executed from BIOS ROM. Typically, the location of the program is fixed (e.g., addressed at FFFF0h of the end of memory). It is advantageous for avoiding the processor from being redesigned when BIOS is enhanced for matching added functions. Typically, the instruction in the address is a simple jump instruction. That is, the jump instruction is adapted to command the processor to jump to another location of the memory where is the beginning address of the computer initialization.

(3) BIOS is adapted to perform a self test to check whether there is fatal error when the computer is turned on. If there is such error (e.g., one that prevents a normal start from occurring) a POST (power on self test) performed by BIOS sounds a warning. An experienced computer user or engineer typically knows the meaning of the sound. No data is shown on the computer monitor at this time. Thus, there is no way of detecting the error if the above action (i.e., POST) is not taken.

(4) Next, BIOS attempts to find a graphics card of the computer and then locates BIOS location of the graphics card if it is found. BIOS of the graphics card is adapted to enable BIOS of the computer to call and take advantage of the graphics card. Procedures of BIOS are stored at address C000h of memory. Initialization of the graphics card can be finished after performing BIOS. Typically, information about hardware including the graphics card is shown on the monitor at this time. For example, hardware information is shown on the monitor after performing the main BIOS before the appearance of energy star icon.

(5) The main BIOS then searches BIOS of any other equipment of the computer and executes the same if found. For example, BIOS of RIDE/DATA hard disk drive can be found at address C8000h. Moreover, the main BIOS will execute BIOS of any found equipment.

(6) A start screen (e.g., one containing an energy star icon) is shown after BIOS activating the graphics card.

(7) BIOS then performs other test actions including memory test and a result thereof will be shown on the monitor. Reasons of any error will be shown on the monitor if such error occurs during this test period. This is because the determination of whether the graphics card is correct or not has been done. In such a manner, any occurred error is apparent to computer user. Thus, the user is able to correct the error.

(8) After performing the test actions in step (7), BIOS knows the current status of any equipment of the computer and thus is able to establish a system table thereafter. Currently, BIOS is very good in automatically detecting system configuration and settings. For example, memory access rate can be automatically detected and set by BIOS. Moreover, BIOS is able to automatically detect hard disk configuration and access mode. Latest BIOS is also able to detect any externally connected hard disk drive. Typically, such equipment is connected to COM or LET port of computer.

(9) For BIOS supporting PAP (Plug and Play), BIOS then has to detect any PAP devices of the computer. Also, description of any found PAP device will be shown on the monitor. The computer is thus able to set the configuration of the PAP device and use the same thereafter (i.e., the PAP device is supported by the computer).

(10) The computer monitor is then scrolled in which BIOS is adapted to show the current status of the computer on the monitor such that not only system configuration is shown but also any installation problem is apparent by referring to the system configuration.

(11) After initializing hardware, BIOS then has to find information from the booting for loading into SO (operating system) such that SO is able to process a portion of tasks. Prior to reading data, BIOS has to know where data is located. Typically, a user may activate a floppy disk, an RIDE or SCSI hard disk, or a CD-ROM drive to boot a computer. Also, an order of searching the above devices (i.e., drives) is preset in BIOS. Next, BIOS searches the above devices by following the order prior to reading boot data from the first found device (i.e., system disk).

(12) After finding the booted device, BIOS then reads data therefrom prior to loading into SO. Typically, after turning on the computer (i.e., activating hard disk drive), BIOS finds a location of cluster 0, head 0, and sector 1 from the master hard disk for accessing boot data. The location is also the first sector of the hard disk. Similarly, BIOS will find the same location from a floppy disk for accessing boot data if the floppy disk is the default system disk.

(13) Next, BIOS searches the above drives by following the order prior to reading boot data from the first found drive. The read data is then loaded to activate SO. BIOS then writes program codes stored at the location into memory and executes the same. As a result, procedures for activating SO are performed.

(14) An error message indicating no system disk is shown on the monitor if BIOS does not find any system disk after fully searching the above drives. Typically, BIOS will ask a user to insert a system diskette into a floppy disk drive if no hard disk is available or no diskette is inserted into the floppy disk drive for turning on the computer. BIOS will show a message such as "Disk boot failure, insert . . . " on the monitor if there is no boot data available from hard or floppy disk drive. A user may insert a system diskette into the floppy disk drive for starting the computer. Another reason for the boot failure is that no active partition of the hard disk drive is programmed previously.

A computer can start normally if none of the following hardware and software components including CPU, memory, CMOS, setting, and battery is found bad after performing BIOS POST However, an error message is shown on the monitor if there is at least one malfunctioned component. Also, POST is interrupted temporarily. A user may turn off the computer to eliminate the source of trouble and turn on the computer thereafter. However, it is not easy for a user to eliminate the source of trouble since only a short message (e.g., CPU error) is shown. Thus, it is desirable among the art to provide a novel method of providing a real time solution to an error occurred when a computer is turned on in order to overcome the above problems of prior art.

SUMMARY OF THE INVENTION

After considerable research and experimentation, a method of providing a real time solution to an error occurred when a computer is turned on according to the present invention has been devised so as to overcome the above drawback of the prior art.

An object of the present invention is responsive to turning on a computer to enable a BIOS installed therein to test all hardware equipment of the computer and record any detected error, and enable the BIOS to show a solution corresponding to the error on a display of the computer through pressing a function key of an input device coupled to the computer while the test is finished.

The above and other objects, features and advantages of the present invention will become apparent from the following detailed description taken with the accompanying drawings.

DETAILED DESCRIPTION OF THE PREFERRED EMBODIMENTS

Figure 1:
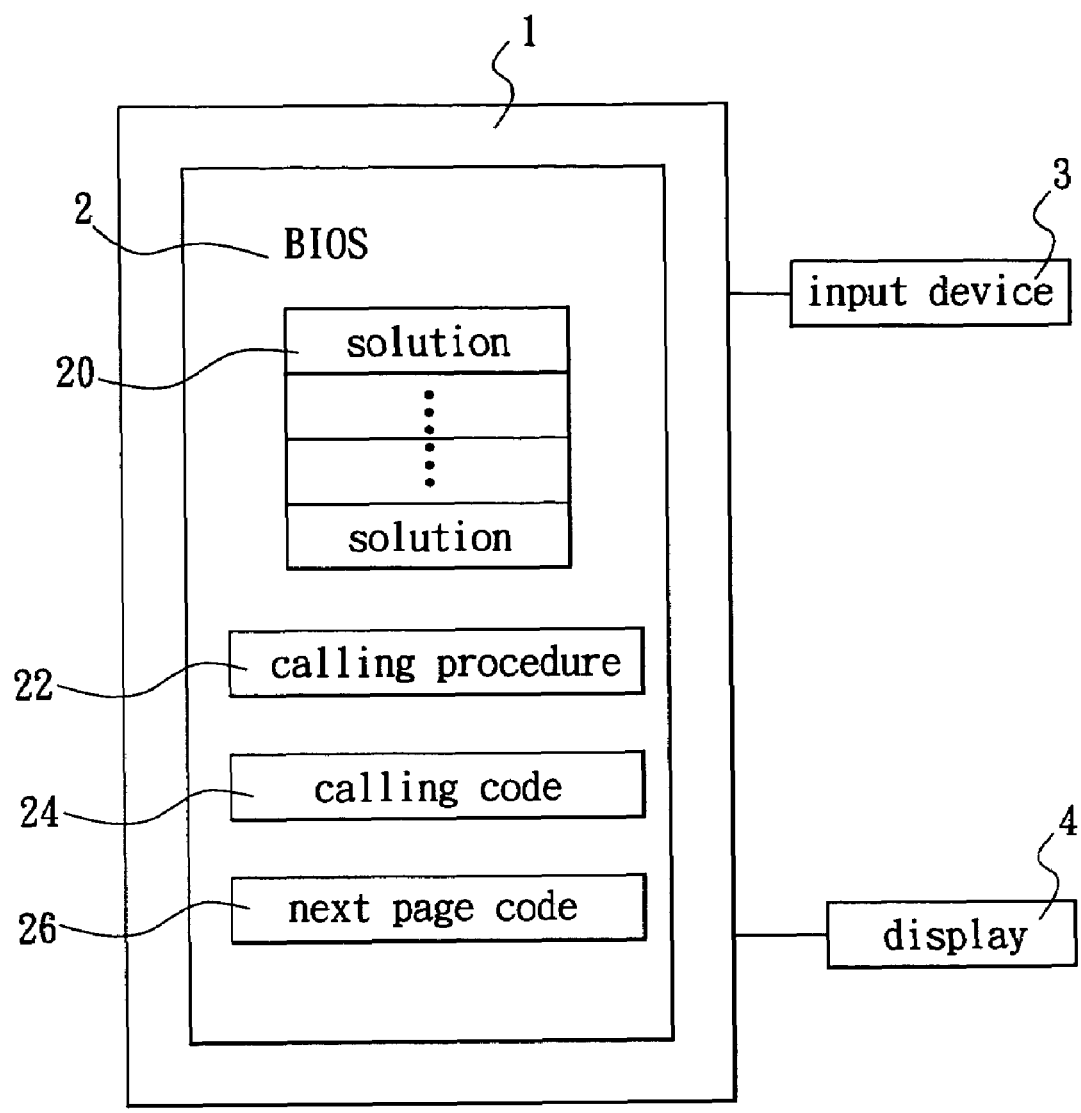
FIG. 1 schematically depicts a structure according to the invention.

Referring to FIG. 1, there is shown a structure for carrying out a method of providing a real time solution to an error occurred when a computer is turned on in accordance with a first preferred embodiment of the invention. As shown, a BIOS 2 is installed in a computer 1 and comprises a plurality of solutions 20 and a calling procedure 22. Each solution 20 is adapted to solve a specific error. An input device 3 (e.g., keyboard or mouse) and a display 4 are connected to the computer 1 respectively. The BIOS 2 begins to test all hardware equipment connected to the computer 1 after the computer 1 is turned on. Details of an error are recorded and any subsequent tests are suspended if such error occurs during the test. Just like a prior BIOS, the BIOS 2 may cause a speaker of the computer 1 to sound a warning or cause the display 4 to show a message indicating the error thereon. Besides, in response to pressing a key (e.g., function key F1 of keyboard) or clicking a left button of a mouse implemented as the input device 3, the calling procedure 22 is enabled to find a corresponding solution 20 of the error. The solution 20 is then shown on the display 4, and enables any user to eliminate the source of trouble by easily following the instruction contained in the solution 20 shown on the display 4. This is a contrast to the prior art which only shows a simple message or sounds a warning when an error occurs, and only few experienced computer users or engineers may be expected to know the meaning of the error by analyzing the sound or message and to eliminate the error thereafter.

Figure 2:
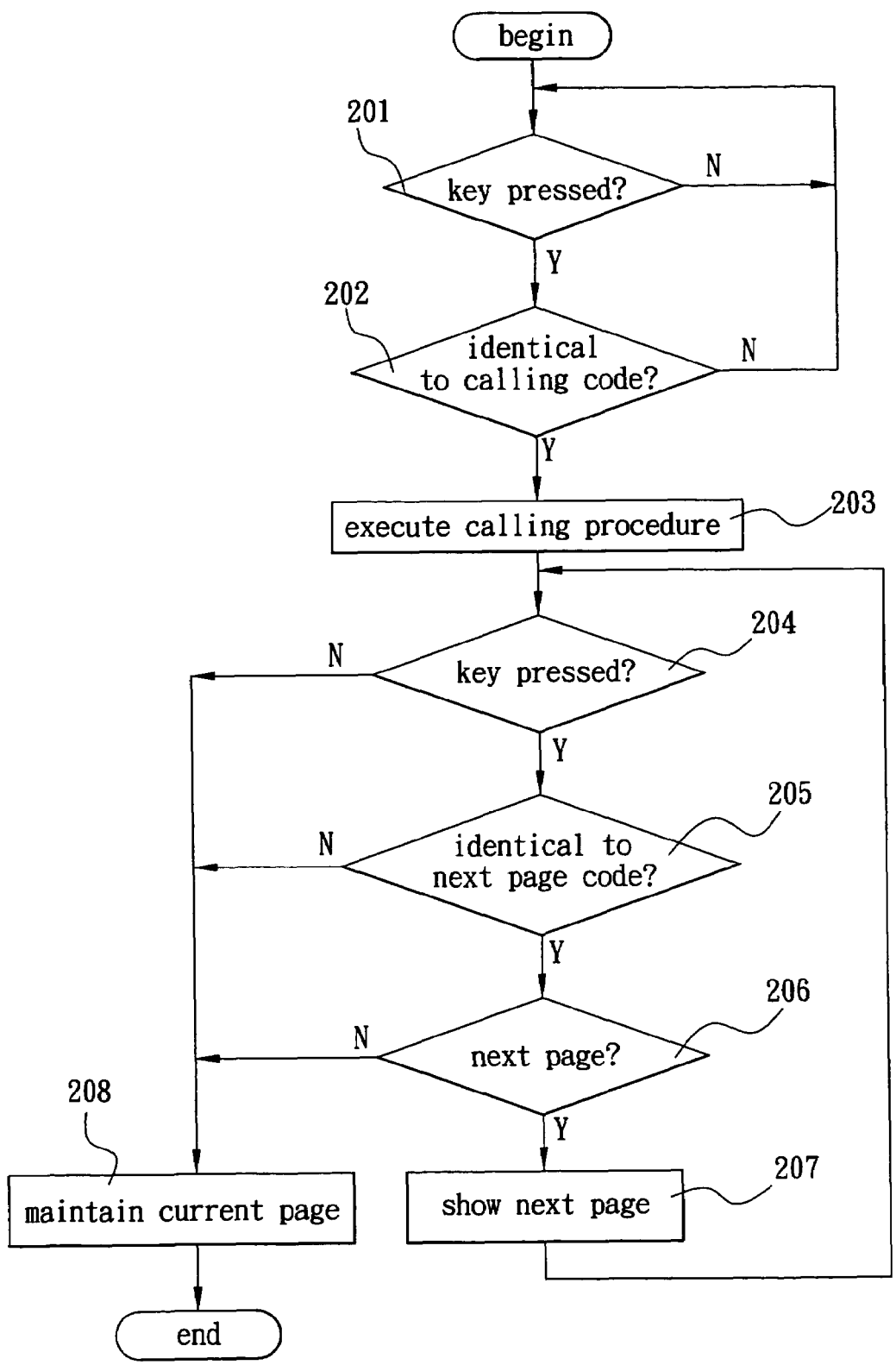
FIG. 2 is a flow chart of a first preferred embodiment of the invention.

It is possible that content of the solution 20 may be too long to be shown on the whole screen of the display 4 at one time. Hence, the BIOS 2 further comprises a calling code 24 and a next page code 26 so that the BIOS 2 may perform the following steps after suspending subsequent test actions as best illustrated in a process according to a first preferred embodiment of the invention of FIG. 2 in conjunction with FIG. 1:

In step 201 it is determined whether a key is pressed or not by detecting a key code generated thereby. If yes, the process goes to step 202. Otherwise, the process loops back to itself.

In step 202 it is determined whether the key code is identical to the calling code 24 or not. If yes, the process goes to step 203. Otherwise, the process loops back to step 201.

In step 203 the calling procedure 22 is executed to find a solution 20 corresponding to the error and show the found solution 20 on the display 4.

In step 204 it is determined whether a key is pressed or not by detecting a key code generated thereby. If yes, the process goes to step 205. Otherwise, the process jumps to step 208.

In step 205 it is determined whether the key code is identical to the next page code 26 or not. If yes, the process goes to step 206. Otherwise, the process jumps to step 208.

In step 206 it is determined whether there is a next page in the solution 20 or not. If yes, the process goes to step 207. Otherwise, the process jumps to step 208.

In step 207 a next page is shown.

In step 208 the current page is maintained.

Whereby, the BIOS 2 is able to display all solutions 20 on the display 4 in a page by page manner. This can eliminate the drawback of omitting some content from being shown on the display 4 because all solutions 20 have to be displayed at once as experienced in the well know technique.

It is assumed that the key code of function key "F1" is identical to calling code 24 and the key code of function key "F2" is identical to next page code 26. The BIOS 2 of the computer 1 begins to test each of a plurality of hardware components of the computer 1 when the computer 1 is turned on. A result of the test is shown on the display 4. In a case of "CPU 2 error" shown on the display 4, a pressing of the key "F1" will additionally show a solution 20 having content such as "CPU in socket 2 has some problems, please replace the CPU and reboot the system again, at the first reboot, you should clear the CPU error status in the BIOS setting . . . " on the display 4. In another case of the solution 20 having further content in a next page, a pressing of the key "F2" will show it on the display 4.

Figure 3:
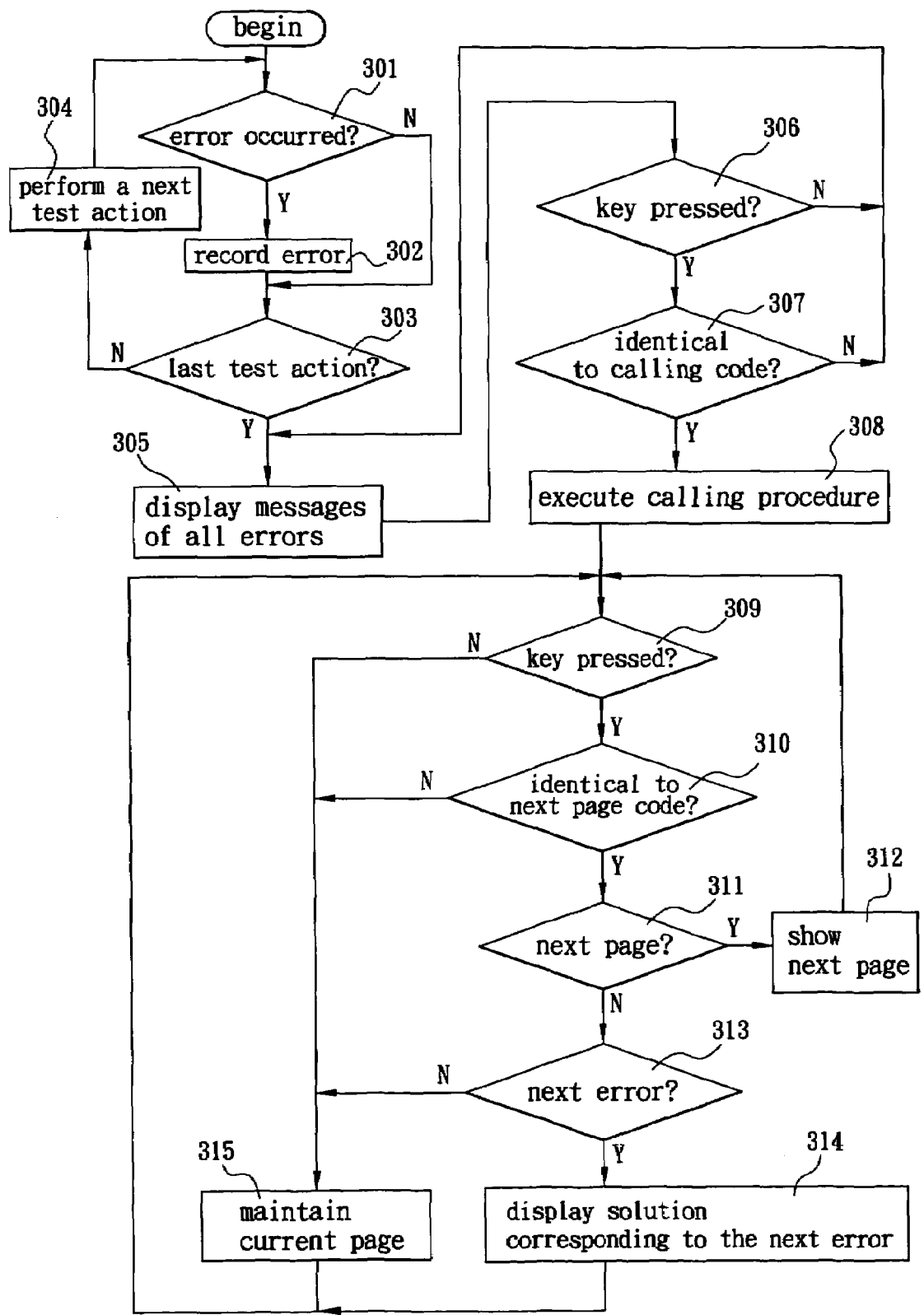
FIG. 3 is a flow chart of a second preferred embodiment of the invention.

Advantageously, the BIOS 2 is able to sequentially perform all test actions when the computer 1 is turned on and record any error occurred in the test, and the display 4 is able to show all error messages so that a user can know all sources of trouble and eliminate the same by disassembling the computer 1 only once (i.e., the inconvenience of a second disassembly of the computer 1 is eliminated). This can be carried out by performing a process as illustrated in a second preferred embodiment of the invention of FIG. 3 in conjunction with FIG. 1. The BIOS 2 begins to test each hardware component of the computer 1 and perform the following steps in the test process when the computer 1 is turned on:

In step 301 it is determined whether an error is occurred or not. If yes, the process goes to step 302. Otherwise, the process jumps to step 303.

In step 302 record the error.

In step 303 it is determined whether a last test action has been performed. If yes, the process jumps to step 305. Otherwise, the process jumps to step 304.

In step 304 perform a next test action prior to looping back to step 301.

In step 305 display messages of all errors.

In step 306 it is determined whether a key is pressed or not by detecting a key code generated thereby. If yes, the process goes to step 307. Otherwise, the process loops back to step 305.

In step 307 it is determined whether the key code is identical to the calling code 24 or not. If yes, the process goes to step 308. Otherwise, the process loops back to step 305.

In step 308 the calling procedure 22 is executed to find a solution 20 corresponding to the first error and show the found solution 20 on the display 4.

In step 309 it is determined whether a key is pressed or not by detecting a key code generated thereby. If yes, the process goes to step 310. Otherwise, the process jumps to step 315.

In step 310 it is determined whether the key code is identical to the next page code 26 or not. If yes, the process goes to step 311. Otherwise, the process jumps to step 315.

In step 311 it is determined whether there is a next page in the solution 20 or not. If yes, the process goes to step 312. Otherwise, the process jumps to step 313.

In step 312 a next page is shown prior to looping back to step 309.

In step 313 it is determined whether there is a next error or not. If yes, the process goes to step 314. Otherwise, the process jumps to step 315.

In step 314 display a solution 20 corresponding to the next error.

In step 315 the current page is maintained prior to looping back to step 309.

In view of the above, it is understood that a user can see one of a plurality of solutions 20 corresponding to each error on the display 4. In response to booting the computer 1, the BIOS 2 does not need to perform the process of solving one error, rebooting the computer 1, and suspending the subsequent test actions if another error (if any) is occurred and detected a plurality of times (i.e., a process of detecting error, solving the error, and rebooting the computer being done once is sufficient for the BIOS 2 of the invention and a plurality of times are required by BIOS 2 of the prior art).

Referring to FIG. 1 again, in the invention the computer 1 is implemented as a notebook computer, a desktop computer, a PDA (personal digital assistant), or a web pad.

In view of the above, the invention is contemplated to generate a message after detecting an error from the booted computer 1. The BIOS 2 then suspends the subsequent test actions and waits for a pressing of key. In response to pressing a key and the key code thereof being identical to the calling code 24 set by the BIOS 2, a solution 20 corresponding to the error is shown on the display 4. As such, a user can know the error and eliminate the source of trouble.

While the invention herein disclosed has been described by means of specific embodiments, numerous modifications and variations could be made thereto by those skilled in the art without departing from the scope and spirit of the invention set forth in the claims.

What is claimed is:

1. A method of providing a real time solution to an error detected by a BIOS installed in a computer comprising the steps of:
   (1) causing the BIOS to test all hardware components of the computer when the computer is turned on and detect whether there is an error or not;
   (2) causing the BIOS to record details of the error;
   (3) causing the BIOS to determine whether all the hardware components have been tested or not;
   (4) causing the BIOS to determine whether a key of an input device connected to the computer is pressed or not by detecting a key code generated thereby;
   (5) causing the BIOS to determine whether the key code is identical to a calling code or not;
   (6) responsive to the determination in step (5) being affirmative, causing the BIOS to execute a calling procedure to find a first solution corresponding to the error and show the first solution on a display connected to the computer;
   (7) causing the BIOS to determine whether a key is pressed or not by detecting a key code generated thereby;
   (8) responsive to the determination in step (7) being affirmative, causing the BIOS to determine whether the key code is identical to a next page code or not;
   (9) responsive to the determination in step (8) being affirmative, causing the BIOS to determine whether there is a next page in the first solution;
   (10) responsive to the determination in step (9) being affirmative, causing the BIOS to show the next page;
   (11) causing the BIOS to determine whether there is a next error or not; and
   (12) responsive to the determination in step (11) being affirmative, causing the BIOS to find a second solution corresponding to the next error and show the second solution on the display; and
   (13) if the determination of step (3) is negative causing the BIOS to test the hardware components of the computer and detect whether there is an error or not.

* * * * *